No. 805,434. PATENTED NOV. 28, 1905.
L. E. ALLEN & W. J. POYSER.
VEHICLE TIRE.
APPLICATION FILED MAY 11, 1905.
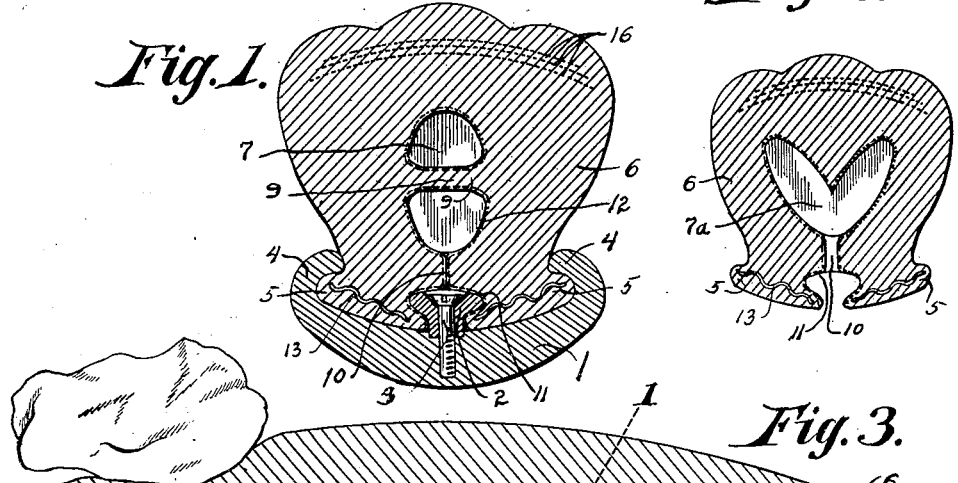
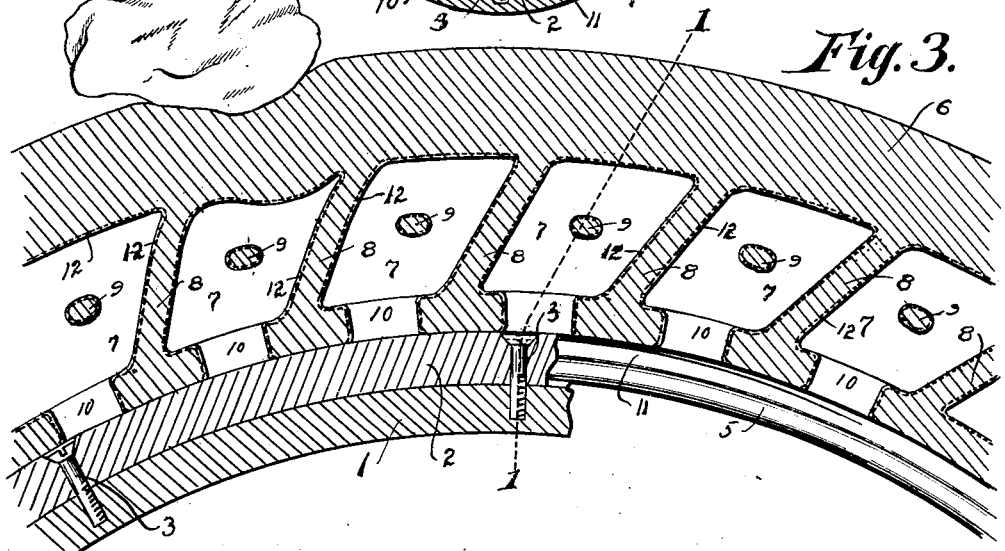
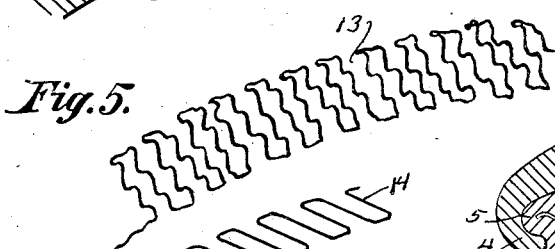
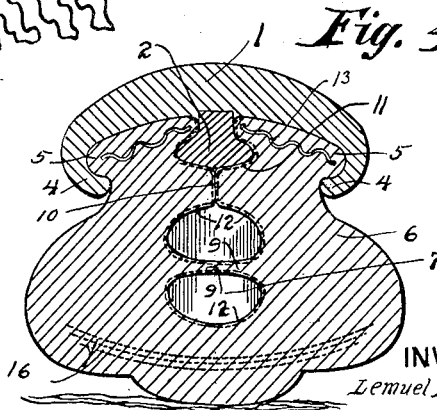
WITNESSES
Jos. J. Hosler
L. M. Bond
INVENTORS
Lemuel E. Allen.
William J. Poyser.
BY H. W. Bond
ATTORNEY

UNITED STATES PATENT OFFICE.

LEMUEL E. ALLEN AND WILLIAM J. POYSER, OF CANTON, OHIO.

VEHICLE-TIRE.

No. 805,434.　　　Specification of Letters Patent.　　　Patented Nov. 28, 1905.

Application filed May 11, 1905. Serial No. 260,020.

*To all whom it may concern:*

Be it known that we, LEMUEL E. ALLEN and WILLIAM J. POYSER, citizens of the United States, residing at Canton, in the county of Stark and State of Ohio, have invented certain new and useful Improvements in Vehicle-Tires; and we do hereby declare that the following is a full, clear, and exact description of the invention, such as will enable others skilled in the art to which it appertains to make and use the same, reference being had to the accompanying drawings, and to the numerals of reference marked thereon, which form a part of this specification.

The present invention relates to vehicle-tires, and more particularly to means for improving the resiliency of the same, or, in other words, to provide a cushion-tire designed for automobiles; but of course we do not desire to limit our invention to any particular class or kind of vehicles.

In the accompanying drawings, Figure 1 is a transverse section on line 1 1, Fig. 3. Fig. 2 is a transverse section of the tire proper, showing a slight modification of the form of the air-chambers. Fig. 3 is a longitudinal section of the tire, also a longitudinal section of the felly and its center rib. Fig. 4 is a transverse section showing the position of the tire when the same is supporting the vehicle or when pressure is brought upon the surface contact of the periphery. Fig. 5 is a detached view of one of the webs. Fig 6 is a similar view showing a modification. Fig. 7 is a detached view of a single inlaid stiffening-wire.

Similar numerals of reference indicate corresponding parts in all the figures of the drawings.

In the accompanying drawings, 1 represents the felly, to which felly are attached in the usual manner the spokes of a wheel, which spokes are of course connected to the hub. The spokes and hub of the wheel form no part of the present invention and of course are not illustrated. The felly 1 is provided with the tire-retaining rib 2, which rib is securely connected to the felly 1 by means of suitable lug-bolts 3 or formed integral with the felly 1. The manner of forming or connecting the rib 2 and connecting the same to the felly is mechanical, and hence we do not desire to be confined to any particular way of securing the rib, as the only object is to provide the felly 1 with the center rib 2. The felly 1 is provided with the inward curved flanges 4, which are for the purpose of embracing the beads 5 and engaging the outer edges of the tire 6. The tire 6 is provided with any desired number of air-chambers 7, which air-chambers are divided by integral partitions 8, and for the purpose hereinafter described the partitions 8 are located at an angle to a radial line drawn transversely through the tire proper. In Fig. 1 the air-chambers 7 are provided with the integral members 9, which integral members are located substantially parallel with the felly 1. It is well understood that when pressure is brought upon the tire the tendency is to squeeze the tire between the surface supporting the vehicle and the felly, thereby flattening or compressing the tire. This feature is illustrated in Fig. 4, and in Fig. 4 one of the members 9 is shown stretched by reason of the pressure brought upon the tires. By providing the members 9 a portion of the strain is taken by the members, which relieves the pressure upon the inward-curved flanges 4. It is well understood that in order to produce the air-chamber 7 some material must be employed to form cores, and after the tire has been properly molded and vulcanized this material must be removed, and in order to accomplish this result elongated openings 10 are provided, which elongated openings lead from the seat of the groove 11 to the chamber 7; but when the tire has been connected to the felly 1 the elongated openings 10 are closed, as illustrated in Figs. 1 and 4.

In the manufacture of our improved tire it is practical to employ some material to inclose the cores, or, in other words, to wrap the cores, which material should be of some thin structure, such as light canvas, as shown at 12, Figs. 1 and 4. This canvas may also, and properly should, line the grooves 11, as illustrated. However, we do not desire to be confined to any particular kind of canvas or material, as the only object is to provide a means for covering the cores. By locating the partitions 8 at an angle to a radial line drawn transversely through the tire any pressure will have a tendency to cause the partitions to assume an angle of greater degree than when in their normal conditions, and if in the event the periphery of the tire strikes a stone or other obstacle, which causes an indentation of the tire, the yielding of the tire will be free and the line of pressure through the tire will not be parallel with the partitions.

In Fig. 3 we have illustrated the manner of action brought about by the indentation of the tire. The obstacle is shown upon the upper portion of the tire; but it will be understood that in actual use the obstacle will be in contact with the bottom of the tire. For the purpose of providing what might be termed "a more rigid neck" for the tire webs, such as 13 or 14, are inlaid and are located substantially as shown in the drawings and are for the purpose of preventing any rupture of the elastic material employed in the manufacture of the tire. We have illustrated what might be termed "inlaid links" 15, which links may be of the form shown and laid parallel, or substantially so, with each other and in close relationship with each other, said links being for the purpose of taking the place of the webs 13 and 14. We have also illustrated strips of canvas 16 embedded in the outer portion of the tire, which are for the purpose of producing a more rigid tire and at the same time providing a tire having a sufficient amount of resiliency.

In Fig. 2 we have illustrated a different form of air-chamber; but this is simply a modification from the air-chamber 7, so far as form is concerned, the result being practically the same in both instances.

It will be understood that when the tire is properly connected to the felly and the neck of the tire compressed, so as to bring the tire within the inward-curved flange, the apertures 10 will be practically closed, but when the tire is detached or before the tire has been attached the openings will be of sufficient size to remove the material forming the cores to produce the air-chambers.

The webs 13 and 14 are of the form shown and bent to produce the webs; but we do not desire to be confined to the precise form of the web, nor do we desire to be confined to the material employed in the manufacture of the webs, as the only object is to provide means for giving strength and preventing the rupture of the elastic tire from the action of the elastic material resulting from pressure brought about by the movement of the vehicle.

Having fully described our invention, what we claim as new, and desire to secure by Letters Patent, is—

1. In a tire for vehicles of the class described, a series of chambers formed in the tire, said chambers separated by radial partitions, integral members located through the chambers and between the radial partitions, said integral members extended parallel with the felly upon which the tire is mounted, substantially as and for the purpose specified.

2. In a tire of the class described, a felly provided with a retaining-rib and a tire formed of elastic material, said tire provided with a neck portion adapted to be located in the felly, said neck portion provided with an annular groove, spaced openings communicating with the annular groove, spaced chambers formed in the tire and the spaced openings communicating with the spaced chambers, substantially as and for the purpose specified.

3. In a tire, the combination of a felly provided with inturned flanges and a center rib, a tire formed of elastic material and provided with a neck portion, said neck portion provided with a groove, said groove adapted to receive the center rib of the felly, spaced chambers formed in the tire and integral members adapted to span the chambers and said integral members formed of elastic material, substantially as and for the purpose specified.

In testimony that we claim the above we have hereunto subscribed our names in the presence of two witnesses.

LEMUEL E. ALLEN.
WILLIAM J. POYSER.

Witnesses:
J. A. JEFFERS,
F. W. BOND.